G. WESTINGHOUSE.
PIPE COUPLING DEVICE.
APPLICATION FILED MAY 19, 1908.
1,063,755.
Patented June 3, 1913.
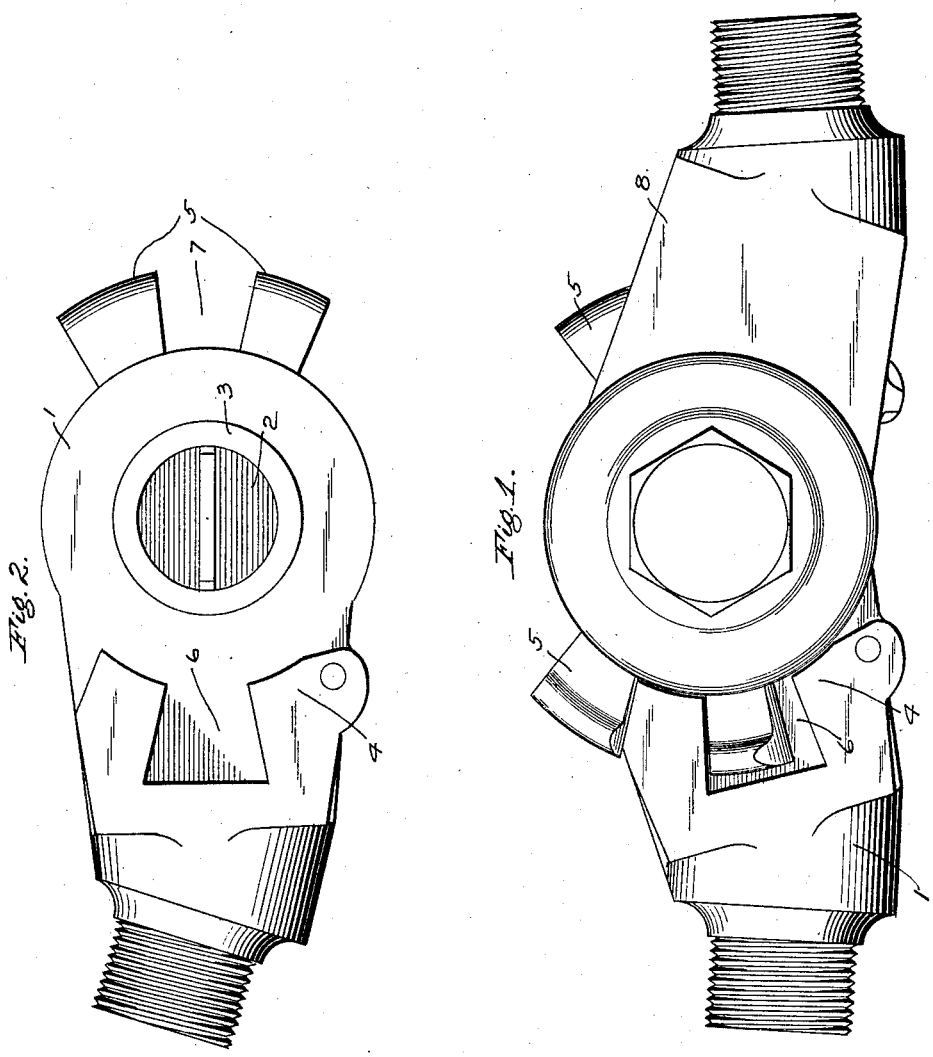
WITNESSES
INVENTOR

UNITED STATES PATENT OFFICE.

GEORGE WESTINGHOUSE, OF PITTSBURGH, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

PIPE-COUPLING DEVICE.

1,063,755.  Specification of Letters Patent.  Patented June 3, 1913.

Application filed May 19, 1908. Serial No. 433,684.

*To all whom it may concern:*

Be it known that I, GEORGE WESTINGHOUSE, a citizen of the United States, residing at Pittsburgh, in the county of Allegheny and State of Pennsylvania, have invented new and useful Improvements in Pipe-Coupling Devices, of which the following is a specification.

This invention relates to pipe couplings, and more particularly to hand operated pipe couplings for connecting up air, steam, and other pipes between cars on railway trains.

My invention has reference more especially to the type of pipe coupling comprising two counterpart heads or half-sections, each having lateral port openings and provided with flanges having locking ribs which are adapted upon relative rotative movement of the heads, with the lateral port openings in alinement, to interlock and thereby couple the counterpart heads together, the heads being first held in an elevated position and then being allowed to descend to the coupled position.

When it is desired to uncouple, the heads are raised to the elevated position, where the locking ribs clear, so that the heads may be freely separated. The brakeman sometimes fails to do this and then when the cars are uncoupled and separate, it is often the case that the heads do not become elevated sufficiently to permit of their disengaging and the consequence is that the flexible pipe or hose connections are stretched toward a horizontal position and are then subjected to severe strains which oftentimes break or tear apart the flexible connections.

The principal object of my present invention is, therefore, to provide an improved pipe coupling and means for permitting the free separation of the coupling half sections upon a slight relative rotation of the sections from the coupled position. By this means it is unnecessary for the brakeman to manipulate the pipe coupling at all in uncoupling, as with my improvements applied the coupling half-sections readily disengage upon separation of the adjacent cars.

Another feature of my improvements contemplates providing a pipe coupling having means for facilitating the uniting of the coupling heads, and wherein a comparatively small rotative movement serves to interlock the heads.

In the accompanying drawing, Figure 1 is a side view of two counterpart pipe coupling half-sections in position for coupling, showing my improvements applied thereto, and Fig. 2 a side view of my improved coupling head.

The pipe coupling half-section or head 1, shown in Fig. 1, is provided with the usual lateral port opening 2 and gasket 3 and carries flanges 4 and 5 provided with the usual locking ribs, the head being adapted to be attached to the flexible pipe or hose connection on the car. According to my improvement the flanges 4 and 5 are cut away so as to provide notches 6 and 7 respectively, and preferably these notches are located at the central part of the flanges. In coupling up, a companion head 8, similarly constructed, is placed on the head 1, with the lateral port openings in alinement and the counterpart flange sections interspersed, as shown in Fig. 1. It will now be seen that a comparatively slight rotative movement of the heads is sufficient to cause the flanges and locking ribs to interlock and couple the heads together, whereas with the ordinary pipe coupling, it is necessary to elevate the half sections so as to permit a rotative movement corresponding in extent with the entire length of the flanges. When it is desired to uncouple, the heads may be elevated to the position shown in Fig. 1, in which the heads are free to separate, or without manipulation by the brakeman, when the adjacent cars are uncoupled, the heads are readily rotated by the separation of the cars, through the short distance necessary to bring the heads to the position shown, so that the heads freely drop apart, as will be apparent.

Where stiff, flexible hose is employed, it is decidedly advantageous to be able to couple up with a small relative rotative movement of the heads, and by reason of the ready separation of the coupling heads when cars are separated, considerable expense and delay is avoided from flexible hose or pipe connections breaking.

Having now described my invention, what I claim as new and desire to secure by Letters Patent, is:—

1. A coupling head for pipe couplings comprising a half section having a lateral port opening and flanges adapted to interlock with similar flanges of a counterpart coupling head upon relative rotative movement of the heads, said flanges being provided with lateral through openings through which portions of the flanges of the counterpart head are adapted to pass in one position of rotation.

2. A coupling head for pipe couplings comprising a half section having a lateral port opening and flanges adapted to interlock with similar flanges of a counterpart coupling head upon relative rotative movement of the heads, and lateral through openings in said flanges for permitting lateral movement therethrough of portions of the flanges in a relative rotative position of the heads.

3. A coupling head for pipe couplings comprising a half section having a lateral port opening and flanges adapted to interlock with similar flanges of a counterpart coupling head upon relative rotative movement of the heads, said flanges having lateral openings therethrough to permit coupling with a counterpart head by relative lateral and then rotative movement of the heads.

4. A coupling head for pipe couplings comprising a half section having a lateral port opening provided with a gasket and flanges adapted to interlock with similar flanges of a counterpart head upon relative rotative movement of the heads and lateral openings through said flanges to permit the lateral passage of flange portions of the counterpart head and thereby the lateral engagement of the gaskets of the two heads at a position in rotation intermediate the usual coupling and uncoupling positions.

In testimony whereof I have hereunto set my hand.

GEO. WESTINGHOUSE.

Witnesses:
 WM. H. CAPEL,
 H. C. TENER.

---

Copies of this patent may be obtained for five cents each, by addressing the "Commissioner of Patents, Washington, D. C."